(12) United States Patent
Jimenez et al.

(10) Patent No.: US 6,182,854 B1
(45) Date of Patent: Feb. 6, 2001

(54) ICE CREAM CONE AND POPSICLE HOLDER

(76) Inventors: Matthew R. Jimenez, 2121 Maxson Rd., El Monte, CA (US) 91733; Rick J. Jimenez, 14420 La Cuarta, Whittier, CA (US) 90602

( * ) Notice: Under 35 U.S.C. 154(b), the term of this patent shall be extended for 0 days.

(21) Appl. No.: 09/385,539

(22) Filed: Aug. 30, 1999

(51) Int. Cl.[7] .............................. A47G 19/22; B65D 1/24; B65D 85/78
(52) U.S. Cl. .................. 220/705; 220/501; 220/254; 229/932; 426/115
(58) Field of Search ..................................... 220/705, 710, 220/574.1, 694, 571, 25 M, 501, 713; 215/392, 393; D1/118; D7/507, 509, 300.2, 605; 426/85, 115; 229/932

(56) References Cited

U.S. PATENT DOCUMENTS

| | | | |
|---|---|---|---|
| D. 370,331 | * | 6/1996 | Haas ........................................ D1/118 |
| D. 373,050 | * | 8/1996 | Brewer et al. ......................... D7/505 |
| 2,321,519 | * | 6/1943 | Rubinoff ................................ 220/737 |
| 2,948,452 | * | 8/1960 | Grogan et al. ......................... 426/132 |
| 2,980,039 | * | 4/1961 | Jolly .................................. 426/134 X |
| 4,226,355 | * | 10/1980 | Helfrich, Jr. ......................... 229/932 X |
| 4,239,175 | * | 12/1980 | Straubinger ........................... 426/85 X |
| 4,813,862 | * | 3/1989 | Bowers et al. ......................... 222/107 |
| 5,224,646 | * | 7/1993 | Biancosino ......................... 220/501 X |
| 5,515,998 | * | 5/1996 | Wang .................................... 220/710 |

* cited by examiner

*Primary Examiner*—Allan N. Shoap
*Assistant Examiner*—Niki M. Eloshway
(74) *Attorney, Agent, or Firm*—Edgar W. Averill, Jr.

(57) ABSTRACT

An ice cream cone and popsicle holder for catching dripping ice cream or popsicles. The holder has a container with a closed bottom and side walls. The side walls support a shelf which extends outwardly from the container and has an outer peripheral wall. The shelf also has an inner cone holding wall with drain holes located either in the shelf or cone holding wall. A hinged popsicle holder is held by either the inner wall, the shelf or the outer peripheral wall. Drain openings are provided in either the inner cone supporting wall or the shelf and extending into the container so that melted ice cream or popsicles will fall into the base of the container. The popsicle holder preferably has a pair of aligned slots for popsicles with two sticks and an opposed center position slot for single stick popsicles. The popsicle holder preferably is hinged so that it closes over the inner cone supporting wall.

7 Claims, 2 Drawing Sheets

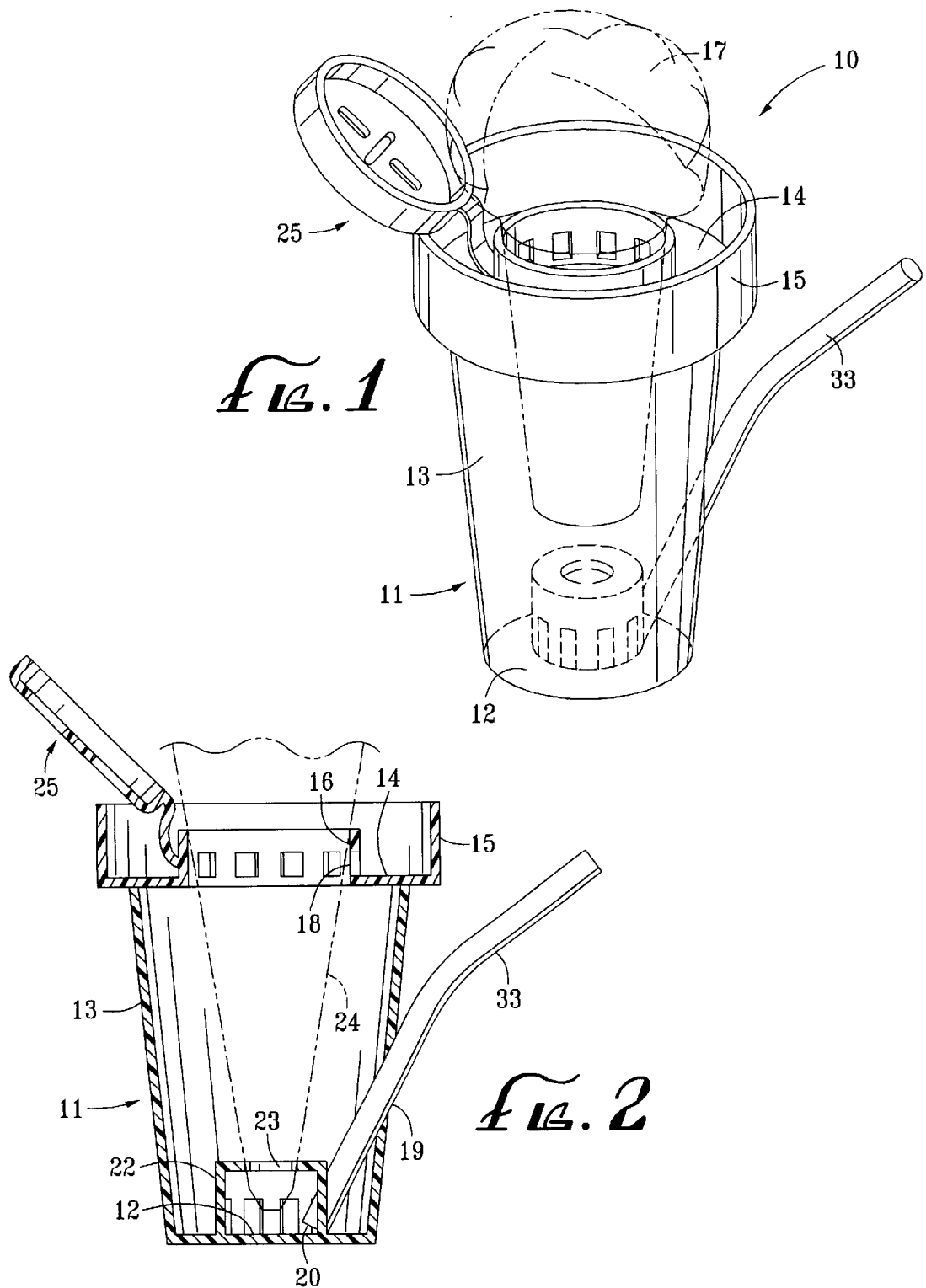

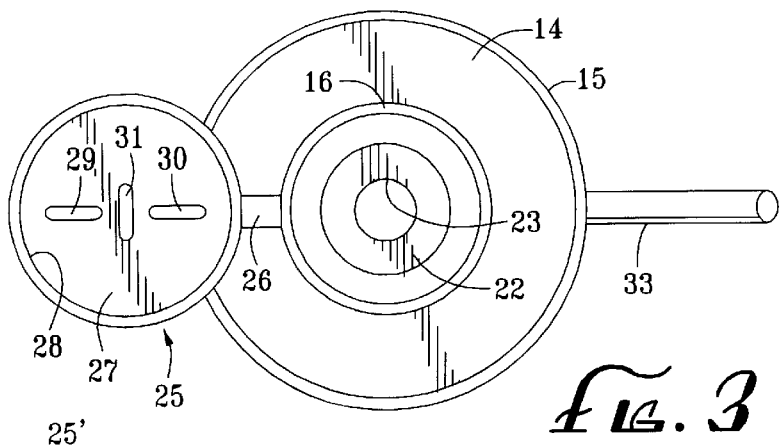
*fig.3*
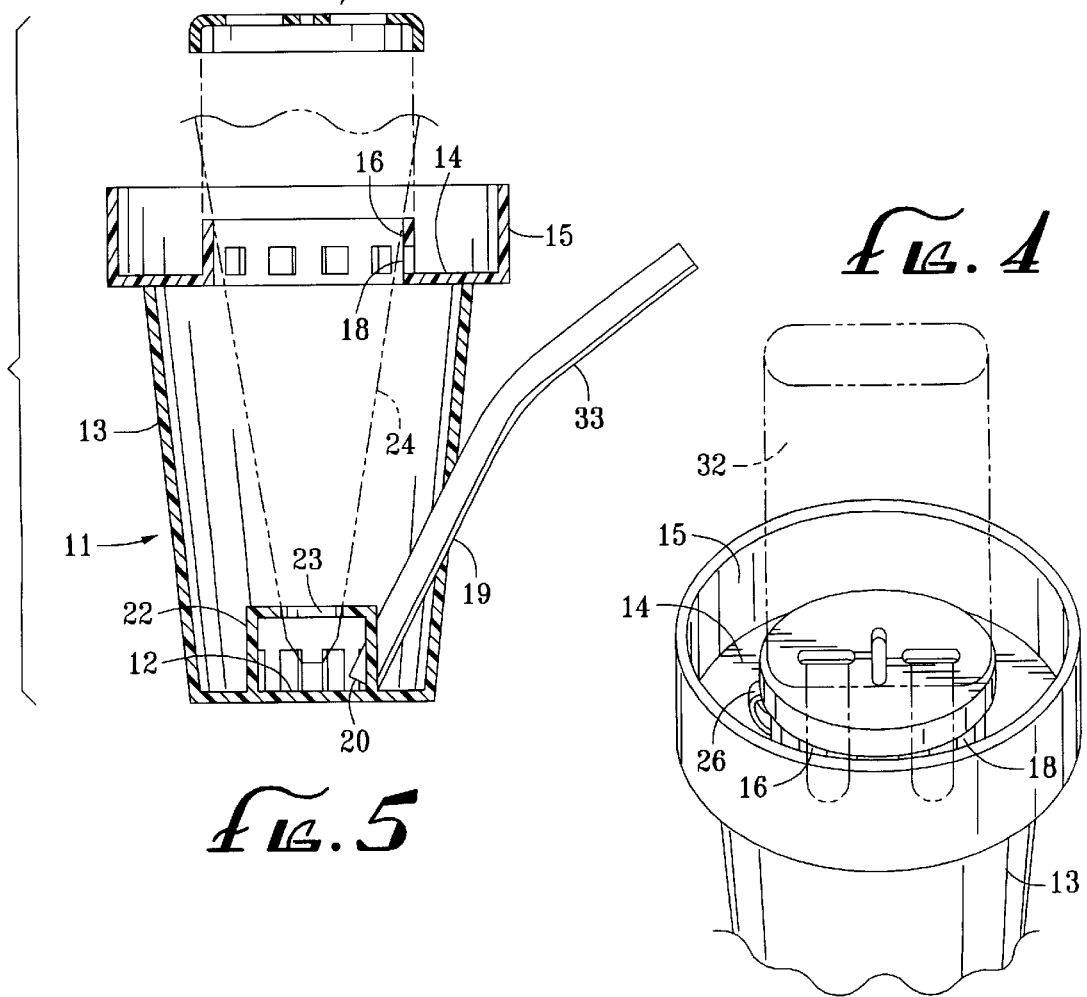
*fig.4*
*fig.5*

ICE CREAM CONE AND POPSICLE HOLDER

BACKGROUND OF THE INVENTION

Ice cream holders have been known for many years.

U.S. Pat. No. 2,948,452 shows another cone holder which also has a drip catching tray.

U.S. Pat. No. 5,224,646 shows both a cone holder and an ice cream holder which also collects melted ice cream in the bottom of a container.

U.S. Pat. No. D373,050 shows a bowl which has an integral molded straw extending through the side and rim thereof.

BRIEF SUMMARY OF THE INVENTION

The present invention is for an ice cream cone and popsicle holder for catching dripping ice cream or popsicles. The holder has a container with a closed bottom. The container has sides which extend upwardly to a shelf. The shelf extends outwardly to an outer peripheral wall and extends inwardly to a cone supporting wall. Drain openings are provided in at least one of the inner cone supporting wall and the shelf above the container so that melted ice cream or popsicle may pass into the container. A popsicle holder is hingedly connected to one of the upwardly directed wall, the shelf, or the inner cone supporting wall. The popsicle holder has a plurality of slots. Preferably, it has two slots which are longitudinally aligned for popsicles with two sticks. It also preferably has a central slot for popsicles with one stick. The popsicle holder may be hingedly closed over the cone supporting wall. A drinking straw may extend through the wall of the container, downwardly to the bottom of the container and upwardly to a position where it is available for the holder of the device.

BRIEF DESCRIPTION OF THE DRAWINGS

FIG. 1 is a perspective view of the ice cream and popsicle holder of the present invention.

FIG. 2 is a cross-sectional view thereof.

FIG. 3 is a top view thereof.

FIG. 4 is a perspective view showing the popsicle holder portion of the holder of FIG. 1, including a popsicle shown in phantom view.

FIG. 5 is an exploded cross-sectional view of an alternate embodiment of the holder of FIG. 1.

DESCRIPTION OF THE PREFERRED EMBODIMENTS

The ice cream and popsicle holder of the present invention is shown in perspective view in FIG. 1 and indicated generally by reference character 10. Holder 10 has a container portion 11 with a closed bottom 12 and a generally cylindrical side wall 13. Side wall 13 extends upwardly as shown best in FIG. 2 to a shelf 14. Shelf 14 extends outwardly to an upwardly directed wall 15. Shelf 14 extends inwardly to a cone supporting wall 16. The inner area provides a moat-like structure which collects any liquid melted from the ice cream shown in phantom view in FIG. 1 and indicated by reference character 17. Openings 18 are provided through the cone supporting wall to provide a drain for melted ice cream. This permits the melted ice cream to pass into the bottom of container 11.

A straw 33 extends through the wall 13 of container 11 at 19 and extends downwardly to a position 20 adjacent closed bottom 12.

A pedestal 22 is formed on the closed bottom 12. It extends upwardly and has a circular opening 23 which helps to support conical cones of the type shown in phantom view in FIG. 2 and indicated by reference character 24.

An important feature of the present invention is that the holder not only holds ice cream cones, but it also holds popsicles. A popsicle holder 25 is held by a hinge 26 to the cone supporting wall 16. Popsicle holder 25 has a cover portion 27. It also has an outer ring 28 which fits snugly over cone supporting wall 16 when the popsicle holder is in a closed position as shown in FIG. 4. Cover portion 27 has two longitudinally aligned slots 29 and 30 which are configured to support popsicles having two sticks. A centrally located slot 31 is used for popsicles having a single stick.

When the popsicle holder 25 is not needed, it may be hinged outwardly as shown in FIG. 1 of the drawings. When it is needed, it is closed over the cone supporting wall and used as shown in FIG. 4. A popsicle is shown in phantom view in FIG. 4 and indicated by reference character 32. Alternatively, as shown in FIG. 5, the popsicle holder 25' can be snapped over the cone supporting wall 16. The result is a holder which may be supplied by sellers of ice cream and popsicles which may be used for either one. It efficiently collects the melted liquid and provides a way of drinking the liquid after it is melted.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An ice cream cone and popsicle holder for catching dripping ice cream comprising:

a container with a closed bottom, sides and an upper periphery;

a shelf extending outwardly from said upper periphery, said shelf terminating in an upwardly directed wall and said shelf extending inwardly to an inner cone supporting wall extending upwardly from said shelf said inner cone supporting wall defining a cone receiving opening;

drain openings in at least one of said inner cone supporting wall and said shelf above said container to permit any melted substance to pass below said shelf into said container; and a popsicle holder connected to one of said upwardly directed wall, said shelf, and said inner cone supporting wall, said popsicle holder having a plurality of slots passing through a cover member said popsicle holder can be moved between a first position wherein the cover extends over said cone receiving opening, and a second position wherein the cover does not extend over said cone receiving opening.

2. The ice cream cone and popsicle holder of claim 1 wherein said popsicle holder has two slots, each slot having a longitudinal axis and the longitudinal axes of said two slots being aligned.

3. The ice cream cone and popsicle holder of claim 2 wherein said popsicle holder has a third slot having a longitudinal axis at a right angle with respect to the longitudinal axis of said two slots.

4. The ice cream cone and popsicle holder of claim 1 wherein said popsicle holder is hingedly connected to said inner cone supporting wall.

5. The ice cream cone and popsicle holder of claim 1 further including a pedestal supported by the closed bottom, said pedestal having a top with a circular opening for holding a bottom of a conical cone.

6. The ice cream cone and popsicle holder of claim 1 further including a straw extending from near said closed bottom, through said sides of said container and terminating above the shelf.

7. The ice cream cone and popsicle holder of claim 1 wherein said popsicle holder is movable from an open position, and has an outer rim which fits over said inner cone supporting wall when moved to a closed position.

* * * * *